US010253700B2

(12) United States Patent
Takahashi

(10) Patent No.: US 10,253,700 B2
(45) Date of Patent: Apr. 9, 2019

(54) VARIABLE COMPRESSION RATIO INTERNAL COMBUSTION ENGINE

(71) Applicant: NISSAN MOTOR CO., LTD., Yokohama-shi, Kanagawa (JP)

(72) Inventor: Eiji Takahashi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/743,816

(22) PCT Filed: Jul. 15, 2015

(86) PCT No.: PCT/JP2015/070226
§ 371 (c)(1),
(2) Date: Jan. 11, 2018

(87) PCT Pub. No.: WO2017/009961
PCT Pub. Date: Jan. 19, 2017

(65) Prior Publication Data
US 2018/0209354 A1 Jul. 26, 2018

(51) Int. Cl.
*F02D 15/02* (2006.01)
*F02B 75/32* (2006.01)
(Continued)

(52) U.S. Cl.
CPC .............. *F02D 15/02* (2013.01); *F02B 75/00* (2013.01); *F02B 75/045* (2013.01);
(Continued)

(58) Field of Classification Search
CPC ...... F02D 15/00; F02D 15/02; F02D 41/2474; F02D 41/221; F02D 41/0255;
(Continued)

(56) References Cited

U.S. PATENT DOCUMENTS 6,691,655 B2 * 2/2004 Aoyama ................. F01L 1/022
 123/406.45
7,360,513 B2 * 4/2008 Takemura ............. F02B 75/048
 123/48 B
(Continued)

FOREIGN PATENT DOCUMENTS

| JP | 2006-226133 A | 8/2006 |
| JP | 2010-151088 A | 7/2010 |

(Continued)

*Primary Examiner* — Grant Moubry
(74) *Attorney, Agent, or Firm* — Foley & Lardner LLP

(57) ABSTRACT

A variable compression ratio internal combustion engine is provided with a variable compression ratio mechanism in which a mechanical compression ratio of the internal combustion engine changes in accordance with a rotational position of a control shaft, a low compression ratio side stopper, a high compression ratio side stopper, a sensor for detecting a rotational position of a drive shaft of an actuator, and an arm press-fitted onto the drive shaft. Relative rotation between the arm and the drive shaft occurs when a torque exceeding an upper-limit torque has been applied. The drive shaft or the control shaft is caused to move to restriction positions restricted by the respective stoppers, and then a diagnosis on the presence or absence of the relative rotation is executed, based on the detected values at the respective restriction positions.

7 Claims, 5 Drawing Sheets

(51) Int. Cl.
*F02B 75/04* (2006.01)
*F02D 41/22* (2006.01)
*F02D 41/24* (2006.01)
*F02B 75/00* (2006.01)
*F02D 15/00* (2006.01)
*F02D 41/02* (2006.01)
*F02D 41/04* (2006.01)

(52) U.S. Cl.
CPC ............ *F02B 75/048* (2013.01); *F02B 75/32* (2013.01); *F02D 15/00* (2013.01); *F02D 41/221* (2013.01); *F02D 41/2474* (2013.01); F02D 41/0255 (2013.01); F02D 41/042 (2013.01); F02D 2041/227 (2013.01); F02D 2200/021 (2013.01); F02D 2200/0802 (2013.01); F02D 2200/101 (2013.01); F02D 2250/16 (2013.01)

(58) Field of Classification Search
CPC ............ F02D 41/042; F02D 2200/021; F02D 2200/101; F02D 2200/0802; F02D 2250/16; F02D 2041/227; F02B 75/00; F02B 75/045; F02B 75/048; F02B 75/32
See application file for complete search history.

(56) References Cited

U.S. PATENT DOCUMENTS

| | | | |
|---|---|---|---|
| 9,476,354 B2* | 10/2016 | Hiyoshi | ................ F02B 75/045 |
| 9,482,161 B2* | 11/2016 | Nagai | .................... F02B 75/045 |
| 9,797,307 B2* | 10/2017 | Onigata | .................. F02D 15/02 |
| 2006/0180118 A1 | 8/2006 | Takemura et al. | |
| 2013/0085654 A1 | 4/2013 | Yamamoto et al. | |
| 2014/0290625 A1* | 10/2014 | Hiyoshi | ................ F02B 75/32 |
| | | | 123/48 R |
| 2018/0058314 A1* | 3/2018 | Okamoto | ................ F02D 45/00 |

FOREIGN PATENT DOCUMENTS

| | | |
|---|---|---|
| JP | 2012-251446 A | 12/2012 |
| JP | 2014-238027 A | 12/2014 |

* cited by examiner

VARIABLE COMPRESSION RATIO INTERNAL COMBUSTION ENGINE

TECHNICAL FIELD

The present invention relates to an internal combustion engine equipped with a variable compression ratio mechanism for variably controlling a compression ratio of the internal combustion engine.

BACKGROUND ART

An internal combustion engine equipped with a variable compression ratio mechanism, in which a compression ratio of the internal combustion engine is variably controlled optimally depending on an operating condition of the internal combustion engine for the purpose of improving a thermal efficiency of a reciprocating internal combustion engine and avoiding abnormal combustion such as knocking or the like, is generally known. For example, internal combustion engines equipped with a variable compression ratio mechanism, which is comprised of a multilink piston-crank mechanism, have been disclosed in Patent documents 1 and 2.

The foregoing variable compression ratio mechanism is provided with a plurality of intermediate links through which a piston and a crankshaft are linked together, and a control link for limiting a degree of freedom of these intermediate links. Also provided is an actuator for changing the rotational position of a control shaft. A relative position of the piston can be vertically displaced by changing the rotational position of the control shaft and by moving a fulcrum of oscillating motion of the control link by means of the actuator, thereby changing a compression ratio.

In general, in this sort of variable compression ratio mechanism, for the purpose of preventing a compression ratio from becoming an excessively high compression ratio or an excessively low compression ratio, some kind of stoppers are often provided for restricting movement of the piston-crank mechanism and for mechanically limiting a variable range of the compression ratio.

However, assuming that a motor, serving as an actuator, attempts to further continue to change the compression ratio even after having been restricted by the stopper, for instance owing to a failure (an abnormality) in a controller that controls the motor, an excessive load may be undesirably applied to each component part.

CITATION LIST

Patent Literature

Patent document 1: Japanese Patent Provisional Publication No. JP2010-151088
Patent document 2: Japanese Patent Provisional Publication No. JP2014-238027

SUMMARY OF INVENTION

A variable compression ratio internal combustion engine of the invention is provided with:

a variable compression ratio mechanism in which a mechanical compression ratio of the internal combustion engine changes in accordance with a rotational position of a compression ratio control member rotated by an actuator;

a mechanical linkage including an arm fitted to a drive shaft of the actuator for transmitting rotary motion of the drive shaft, while converting the rotary motion of the drive shaft to rotary motion of the compression ratio control member;

a sensor for detecting a rotational position of the drive shaft as a parameter corresponding to the compression ratio; and at least one stopper for restricting movement of the compression ratio control member or movement of the linkage at a position corresponding to an upper-limit compression ratio or a lower-limit compression ratio.

Also provided is a controller configured to execute a diagnosis, based on a detected value of the sensor in a state where the compression ratio control member or the linkage has been restricted by the stopper, on whether or not relative rotation of a fitted portion of the arm with respect to the drive shaft is present.

With the previously-discussed configuration, assume that the motor attempts to further continue to change the compression ratio even after having been restricted by the stopper, for instance owing to a failure in the controller. In such a case, relative rotation between the arm and the drive shaft occurs. Due to the occurrence of relative rotation, the relationship between the detected value of the sensor and the compression ratio becomes inappropriate. In this invention, a self-diagnosis on the presence or absence of the above-mentioned relative rotation is executed.

According to the invention, when relative rotation between the arm and the drive shaft occurs, it is possible to certainly detect the relative rotation.

DESCRIPTION OF EMBODIMENTS

Hereinafter explained in detail in reference to the drawings are embodiments of the present invention.

Figure 1:
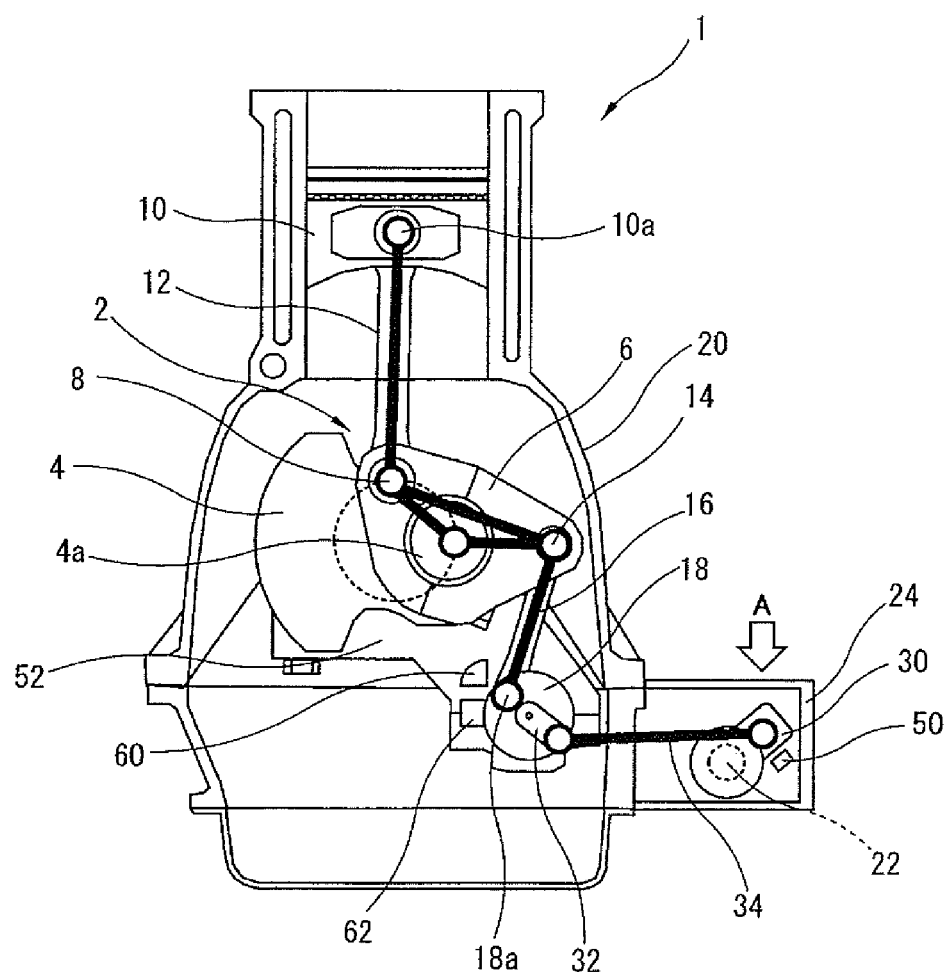
FIG. 1 is a sectional view schematically illustrating a variable compression ratio internal combustion engine equipped with a multilink variable compression ratio mechanism.

As shown in FIG. 1, a variable compression ratio internal combustion engine 1 is equipped with a variable compression ratio mechanism 2 which utilizes a well-known multilink piston-crank mechanism. The variable compression ratio mechanism 2 is mainly comprised of a lower link 6, an upper link 12, a control link 16, and a control shaft 18. Lower link 6 is rotatably supported on a crankpin 4*a* of a crankshaft 4. Upper link 12 links an upper pin 8 located at one end of lower link 6 and a piston pin 10*a* of a piston 10 together. One end of control link 16 is linked to a control pin 14 located at the other end of lower link 6. Control shaft 18 rockably supports the other end of control link 16. Crankshaft 4 and control shaft 18 are rotatably supported by means of respective bearing structures (not shown) within a crankcase, which is a lower section of a cylinder block 20.

Control shaft 18 has an eccentric shaft portion 18a whose position can be displaced or changed in accordance with rotary motion of control shaft 18. The other end of control link 16 is rotatably fitted onto the eccentric shaft portion 18a. In the variable compression ratio mechanism 2, a top dead center (TDC) position of piston 10 is vertically displaced in accordance with rotary motion of control shaft 18, thereby changing a mechanical compression ratio. That is to say, in this embodiment, control shaft 18 corresponds to a compression ratio control member. Therefore, the mechanical compression ratio can be univocally determined in accordance with a rotational position of control shaft 18 corresponding to the compression ratio control member.

Figure 2:
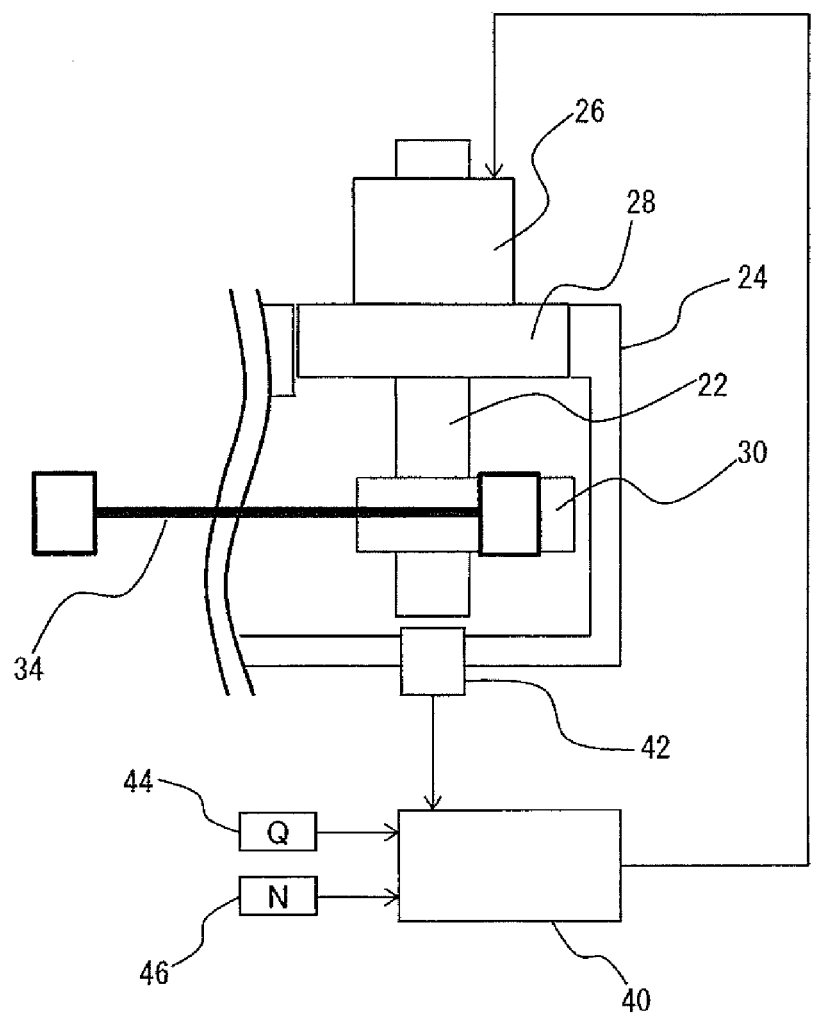
FIG. 2 is a view taken in the direction of the arrow A of FIG. 1.

As a drive mechanism that variably controls a compression ratio of variable compression ratio mechanism 2, that is, a rotational position of control shaft 18, an actuator 24 is located at the lower part of cylinder block 20. The actuator has a drive shaft 22 parallel to the crankshaft 4. As shown in FIG. 2, actuator 24 is constructed by an electric motor 26 that serves as an actuator main body and a speed reducer 28 that reduces output rotation of electric motor 26 and outputs the speed-reduced output through the drive shaft 28. The electric motor 26 and the speed reducer 28 are connected and arranged in series. Drive shaft 22 is configured to rotate within a prescribed angular range from an angular position corresponding to a low compression ratio to an angular position corresponding to a high compression ratio. Drive shaft 22 and control shaft 18 are positioned parallel to each other. To permit both the drive shaft and the control shaft to rotate in conjunction with each other, a first arm 30 press-fitted onto the drive shaft 22 and a second arm 32 fixed to the control shaft 18 are linked to each other via an intermediate link 34.

When the drive shaft 22 of actuator 24 rotates, the rotary motion is transmitted from the first arm 30 through the intermediate link 34 to the second arm 32, and thus the control shaft 18 rotates. Hereby, as discussed above, a mechanical compression ratio of internal combustion engine 1 changes. That is, in this embodiment, the first arm 30, the second arm 32, and the intermediate link 34 correspond to a mechanical linkage that transmits rotary motion of drive shaft 22, while converting the rotary motion of the drive shaft to rotary motion of control shaft 18. By the way, in the shown embodiment, a link mechanism is used as a mechanical linkage. In lieu thereof, another type of linkage may be used.

A target compression ratio of variable compression ratio mechanism 2 is set depending on an engine operating condition (for example, a required load and an engine revolution speed) within a controller 40. Actuator 24, that is, electric motor 26 is driven and controlled so as to realize the target compression ratio. The rotational position of drive shaft 22, corresponding to an actual mechanical compression ratio, is detected by an actual compression ratio sensor 42. Feedback control for electric motor 26 is carried out so as to bring the detected actual compression ratio to the target compression ratio. Actual compression ratio sensor 42 is a non-contact type sensor that is arranged to be opposed to the top end of drive shaft 22. The actual compression ratio sensor is provided to detect and read the angular position of a detected object (not shown) comprised of a permanent magnet embedded in the top end face of drive shaft 22 and output the detected value to the controller 40. Controller 40 is configured to drive and control the actuator 24 based on this detected value.

In addition to a signal from the actual compression ratio sensor 42, signals from other sensors, namely, an airflow meter 44 for detecting an intake air quantity Q, a crankangle sensor 46 for detecting an engine revolution speed N and the like are inputted into the controller 40. Controller 40 is also configured to optimally control the compression ratio based on these detected input informational data signals.

As a trend of basic compression ratio control, a high target compression ratio is given at a low load side for the purpose of improving a thermal efficiency, whereas a low target compression ratio is given at a high load side for the purpose of avoiding knocking.

In order to mechanically limit a variable range of the compression ratio by means of the variable compression ratio mechanism 2, internal combustion engine 1 has a low compression ratio side stopper 50 for restricting excessive rotation of control shaft 18 to the low compression ratio side and a high compression ratio side stopper 60 for restricting excessive rotation of control shaft 18 to the high compression ratio side.

Low compression ratio side stopper 50 is formed to protrude inside of the housing of actuator 24 such that the first arm 30 is brought into abutted-engagement with the low compression ratio side stopper at a position corresponding to a lower-limit compression ratio. Therefore, when the drive shaft 22 is rotated to the position corresponding to the lower-limit compression ratio, the first arm 30 abuts on the low compression ratio side stopper 50 such that the drive shaft 22 and therefore the control shaft 18 is restricted so as not to further rotate to the low compression ratio side. That is, the lower limit of the compression ratio is limited at the position where the low compression ratio stopper 50 and the first arm 30 abut each other.

On the other hand, high compression ratio side stopper 60 is formed to protrude from a member (for example, a bearing cap 52) that constructs a bearing for the control shaft 18 at a position corresponding to an upper-limit compression ratio. A protruding portion 62 is provided at a predetermined position of the control shaft 18 such that the protruding portion can be brought into abutted-engagement with the high compression ratio side stopper 60. Therefore, when the drive shaft 22 is rotated to the position corresponding to the upper-limit compression ratio, the protruding portion 62 abuts on the high compression ratio side stopper 60 such that the control shaft 18 and therefore the drive shaft 22 is restricted so as not to further rotate to the high compression ratio side. That is, the upper limit of the compression ratio is limited at the position where the high compression ratio side stopper 60 and the protruding portion 62 abut each other.

In this manner, the low compression ratio side stopper 50 and the high compression ratio side stopper 60 serve to limit or restrict movement of the linkage between the position corresponding to the lower-limit compression ratio and the position corresponding to the upper-limit compression ratio. As a result of this, the compression ratio varies only between the lower-limit compression ratio and the upper-limit compression ratio.

By the way, in the shown embodiment, the low compression ratio side stopper 50 is provided inside of the actuator 24, whereas the high compression ratio side stopper 60 is provided on the main body side of internal combustion engine 1. It will be understood that the positions of stoppers 50, 60 are not limited to the particular embodiments shown and described herein, but these stoppers may be arranged at respective arbitrary positions where rotary motion of the first arm 30 and rotary motion of the control shaft 18 can be restricted. For instance, the low compression ratio side stopper and the high compression ratio side stopper may be both positioned or provided inside of the actuator 24. In lieu thereof, these stoppers may be both positioned or provided on the main body side of internal combustion engine 1.

In the shown embodiment, the first arm 30 and the drive shaft 22 are configured such that relative rotation between them is permitted by excessive torque. Concretely, the first arm 30 is press-fitted onto the drive shaft 22 with a preset interference corresponding to a target upper-limit torque. Hence, when a torque exceeding the upper-limit torque has been applied, relative rotation between the first arm 30 and the drive shaft 22 occurs. By the way, the press-fit bearing portion of the first arm 30 may be configured as a split type in which the press-fit bearing portion is split into two bearing halves and thus these two halves are fastened together with screws.

Assume that the electric motor 26 attempts to further continue to change the compression ratio even after having been restricted by the stoppers 50, 60, for instance owing to a failure (an abnormality) in the controller 40 that controls the electric motor 26, and thus the drive shaft 22 continues rotating. In such a case, an excessive load is applied to each component part of the linkage extending from the first arm 30 to the control shaft 18. In the shown embodiment, even in the event that the drive shaft 22 further continues rotating after having been restricted by the stoppers 50, 60, relative rotation between the first arm 30 and the drive shaft 22 occurs immediately when a torque exceeding the upper-limit torque has been applied. Therefore, there is a less excessive load applied to other parts of the linkage except the previously-discussed fit portion (the press-fit bearing portion).

By the way, in the case of the configuration as discussed previously, there is a possibility that relative rotation between the above-mentioned members to undesirably occur by an excessive input torque caused by a factor other than a failure in the controller 40. When this kind of relative rotation occurs, the compression ratio cannot be controlled normally. Therefore, in the shown embodiment, controller 40 is further configured to diagnose whether or not relative rotation is present.

Figure 3:
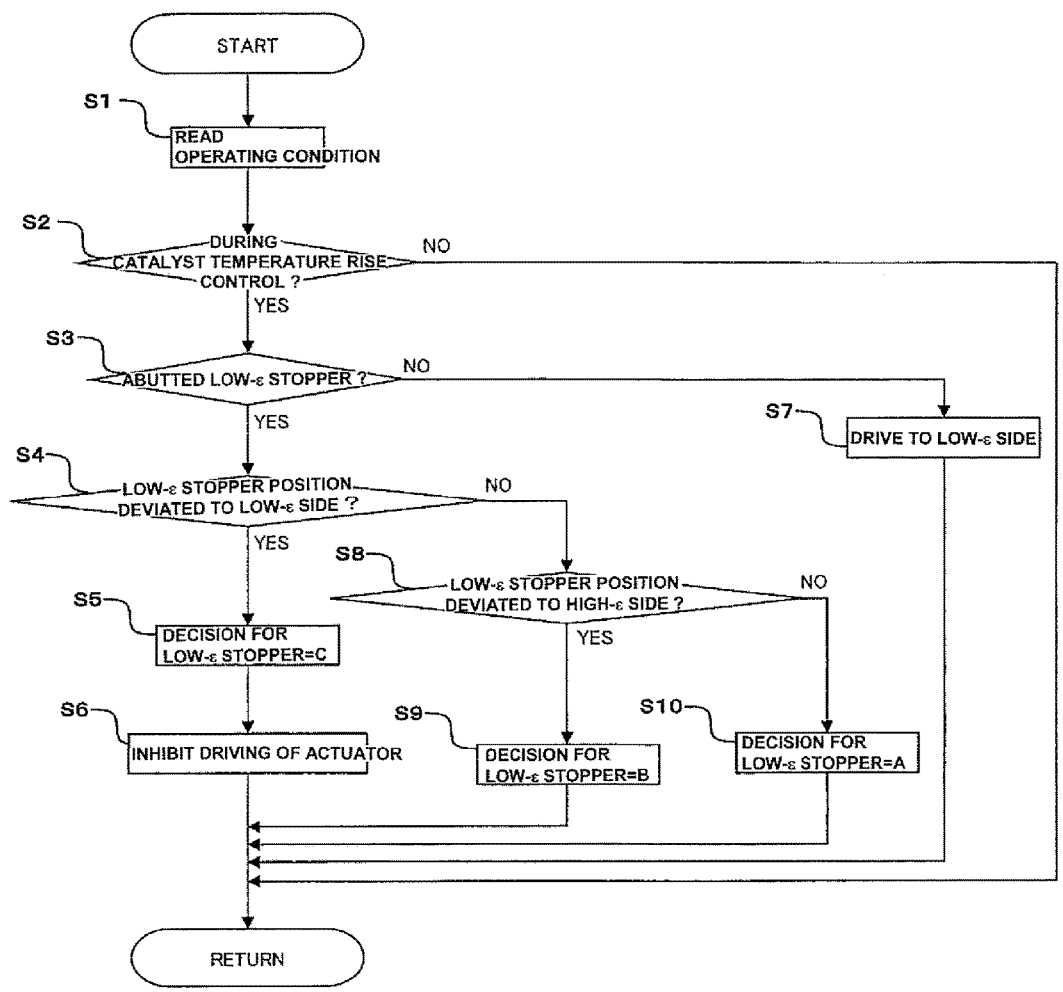
FIG. 3 is a flowchart illustrating diagnostic processing for diagnosing relative rotation of the drive shaft through the use of a low compression ratio side stopper.
Figure 4:
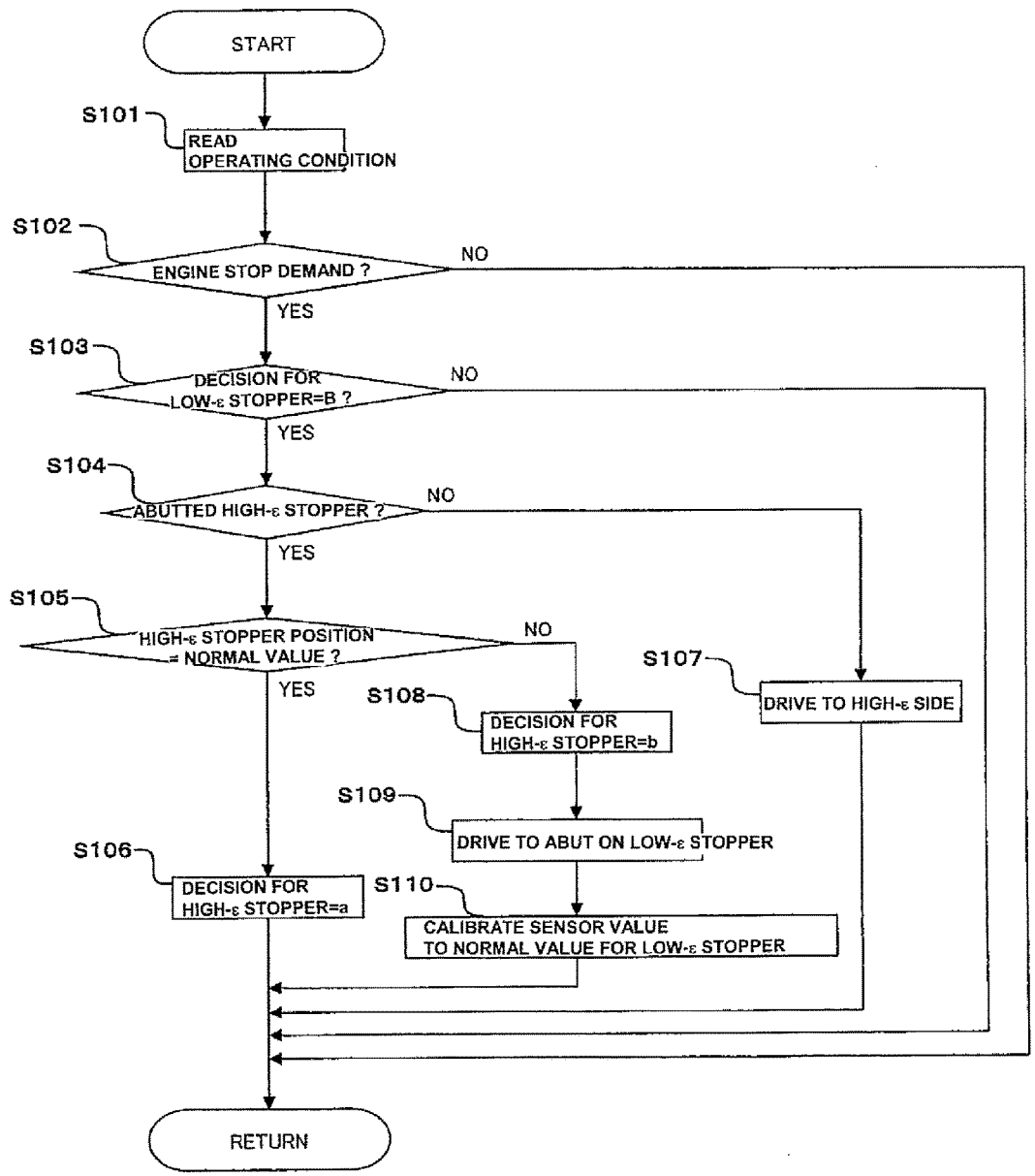
FIG. 4 is a flowchart illustrating diagnostic processing for diagnosing relative rotation of the drive shaft through the use of a high compression ratio side stopper.

Hereunder explained in reference to FIGS. 3 and 4 is a diagnosis on the presence or absence of relative rotation of the drive shaft 22. FIG. 3 is the flowchart illustrating diagnostic processing for diagnosing relative rotation of the drive shaft 22 through the use of the low compression ratio side stopper 50, whereas FIG. 4 is the flowchart illustrating diagnostic processing for diagnosing relative rotation of the drive shaft 22 through the use of the high compression ratio side stopper 60. In the shown embodiment, a diagnosis using the low compression ratio side stopper 50 and a diagnosis using the high compression ratio side stopper 60 are executed in parallel with each other.

The diagnosis shown in FIG. 3 using the low compression ratio side stopper 50 is executed during catalyst temperature rise control immediately after internal combustion engine 1 has been started from cold.

At step S1, an operating condition of the internal combustion engine is read. Then, the routine proceeds to step S2. At step S2, a check is made to determine whether catalyst temperature rise control is in operation or not. When catalyst temperature rise control is in operation, the routine proceeds to step S3. Conversely when catalyst temperature rise control is not in operation, the routine terminates.

At step S3, a check is made to determine whether or not the first arm 30 abuts on the low compression ratio side stopper (abbreviated to "low-s stopper") 50. When the first arm 30 does not abut on the low compression ratio side stopper 50, the routine proceeds to step S7. At step S7, the drive shaft 22 is rotated to the low compression ratio side (the low-s side) by the actuator 24. By virtue of repeated executions of steps S3 and S7, the actuator 24 is driven until such time that the first arm 30 is brought into abutted-engagement with the low compression ratio side stopper 50. For instance, a determination on whether or not the first arm 30 abuts on the low compression ratio side stopper 50 is made by a change of electric current of electric motor 26. Immediately when the first arm 30 is brought into abutted-engagement with the low compression ratio side stopper 50, the routine proceeds to step S4.

At step S4, a check is made to determine whether a detected value of actual compression ratio sensor 42 is a value of the low compression ratio side lower than a low compression ratio side normal value (a reference value corresponding to the lower-limit compression ratio). When the first arm 30 has been brought into abutted-engagement with the low compression ratio side stopper 50 and an abnormality such as the previously-discussed relative rotation is not present, the rotational position of drive shaft 22 corresponding to the lower-limit compression ratio is outputted as a detected value of actual compression ratio sensor 42. Conversely when relative rotation of the drive shaft 22 to the first arm 30 toward the low compression ratio side is present, the detected value of actual compression ratio sensor 42 becomes or deviates to a value of the low compression ratio side. In this manner, when the detected value of actual compression ratio sensor 42 deviates to a value of the low compression ratio side, the routine proceeds to step S5. At step S5, a decision value for the low compression ratio side stopper 50 is set to "C", and then the routine proceeds to step S6.

At step S6, the driving of actuator 24 is stopped (inhibited), and then the routine terminates. By the way, the control shaft 18 and therefore the first arm 30 is constantly biased toward the low compression ratio side by virtue of an in-cylinder pressure load, and thus, basically, there is no deviation of the drive shaft 22 to the low compression ratio side. Therefore, when the detected value, which deviates to a value of the low compression ratio side, has been outputted, it is determined that the abnormal detected value arises from a failure (an abnormality) in the controller 40, and then the actuator 24 is stopped.

In contrast, when step S4 determines that the detected value of actual compression ratio sensor 42 does not deviate to a value of the low compression ratio side, the routine proceeds to step S8. At step S8, a check is made to determine whether the detected value of actual compression ratio sensor 42 is a value of the high compression ratio side higher than the previously-discussed normal value. When the detected value of actual compression ratio sensor 42 deviates to a value of the high compression ratio side, the routine proceeds to step S9. At step S9, a decision value for the low compression ratio side stopper 50 is set to "B", and then the routine terminates.

Conversely when step S8 determines that the detected value of actual compression ratio sensor 42 does not deviate to a value of the high compression ratio side, the routine proceeds to step S10. At step S10, a decision value for the low compression ratio side stopper 50 is set to "A" (that is, "normality"), and then the routine terminates.

Next, the diagnosis on relative rotation of the drive shaft 22 using the high compression ratio side stopper 60 is hereunder explained in reference to FIG. 4. The diagnosis using the high compression ratio side stopper 60 is executed at the time of stop processing of internal combustion engine 1.

At step S101, an operating condition of the internal combustion engine is read. Then, the routine proceeds to step S102. At step S102, a check is made to determine whether or not an engine stop demand is present. When the engine stop demand is present, the routine proceeds to step S103. Conversely when the engine stop demand is not present, the routine terminates.

At step S103, a check is made to determine whether or not the decision value for the low compression ratio side stopper 50 is "B" (in other words, the detected value in a condition of being in abutted-engagement with the low compression ratio side stopper 50 deviates to the high compression ratio side). When the decision value is "B", the routine proceeds to step S104. Conversely when the decision value is not "B", the routine terminates.

At step S104, a check is made to determine whether or not the protruding portion 62 abuts on the high compression ratio side stopper (abbreviated to "high-E stopper") 60. When the protruding portion 62 does not abut on the high compression ratio side stopper 60, the routine proceeds to step S107. At step S107, the drive shaft 22 is driven and rotated to the high compression ratio side (the high-s side) by the actuator 24. By virtue of repeated executions of steps S104 and S107, the actuator 24 is driven until such time that the protruding portion 62 is brought into abutted-engagement with the high compression ratio side stopper 60. Immediately when the protruding portion 62 is brought into abutted-engagement with the high compression ratio side stopper 60, the routine proceeds to step S105.

At step S105, a check is made to determine whether a detected value of actual compression ratio sensor 42 is a high compression ratio side normal value (a reference value corresponding to the upper-limit compression ratio). When the detected value of actual compression ratio sensor 42 is the normal value, the routine proceeds to step S106. At step S106, a decision value for the high compression ratio side stopper 60 is set to "a" (that is, "normality"), and then the routine terminates. Hereupon, a case where the decision value for the high compression ratio side stopper 60 is "a" means that the range of the compression ratio is limited due to foreign matter jammed or bitten into the control shaft 18 or the like, on condition that the decision value for the low compression ratio side stopper 50 is "B", in other words, the detected value deviates to the high compression ratio side (see a sensor output characteristic S4 of FIG. 5, as described later).

In contrast, when step S105 determines that the detected value of actual compression ratio sensor 42 is not the normal value, the routine proceeds to step S108. At step S108, a decision value for the high compression ratio side stopper 60 is set to "b", and then the routine proceeds to step S109. At step S109, the actuator 24 is driven until such time that the first arm 30 is brought into abutted-engagement with the low compression ratio side stopper 50. Then, the routine proceeds to step S110. At step S110, the detected value of actual compression ratio sensor 42 (the sensor output value) is calibrated or corrected to the low compression ratio side normal value for low compression ratio side stopper 50, and then the routine terminates. A case where the decision value for the low compression ratio side stopper 50 is "B" and the decision value for the high compression ratio side stopper 60 is "b" means that relative rotation of the drive shaft 22 to the first arm 30 toward the high compression ratio side occurs (see a sensor output characteristic S2 of FIG. 5). When the above-mentioned relative rotation occurs, a difference between the sensor output (the detected value of the sensor) and the actual compression ratio occurs, and therefore correcting the above-mentioned difference enables subsequent exact control.

In this manner, according to the embodiment, the first arm 30 and the control shaft 18 are caused to move to a low compression ratio side restriction position and a high compression ratio side restriction position restricted by the low compression ratio side stopper 50 and the high compression ratio side stopper 60 respectively, and then a diagnosis on the presence or absence of relative rotation of the drive shaft 22 can be made based on a decision made from a detected value of actual compression ratio sensor 42 at each of the low compression ratio side restriction position and the high compression ratio side restriction position. Simultaneously, it is possible to distinguish the above-mentioned relative rotation from any other abnormality that the range of the compression ratio is limited.

Figure 5:
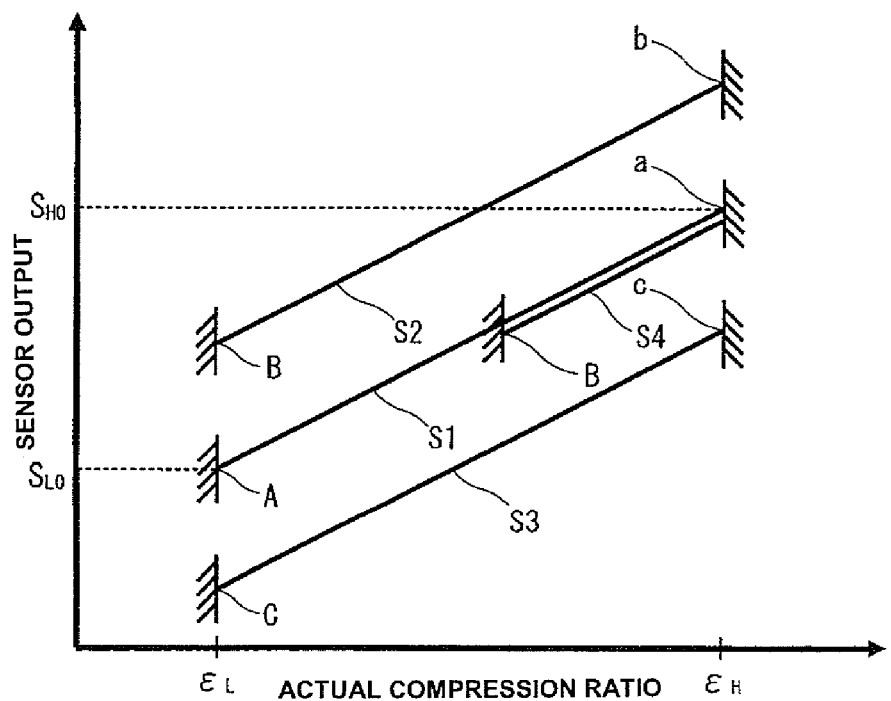
FIG. 5 is a graph illustrating the relationship between a sensor output and an actual compression ratio.

Referring to FIG. 5, there is shown the graph illustrating the characteristic of an output S of actual compression ratio sensor 42 at any actual compression ratio.

In the graph, a characteristic S1 indicates a normal case where the decision value for the low compression ratio side stopper 50 is "A" and the decision value for the high compression ratio side stopper 60 is "a", and hence a detected value $S_L$ of actual compression ratio sensor 42 for the lower-limit compression ratio $\varepsilon_L$ becomes identical to the reference value $S_{L0}$ and a detected value $S_H$ of actual compression ratio sensor 42 for the upper-limit compression ratio $\varepsilon_H$ becomes identical to the reference value $S_{H0}$.

A characteristic S2 indicates a case where the decision value for the low compression ratio side stopper 50 is "B" and the decision value for the high compression ratio side stopper 60 is "b", and hence the detected value $S_L$ of actual compression ratio sensor 42 for the lower-limit compression ratio $\varepsilon_L$ becomes higher than the reference value $S_{L0}$ and the detected value $S_H$ of actual compression ratio sensor 42 for the upper-limit compression ratio $\varepsilon_H$ becomes higher than the reference value $S_{H0}$. This indicates or means the occurrence of relative rotation of the drive shaft 22 to the first arm 30 toward the high compression ratio side. In this case, the detected value $S_L$ is calibrated or corrected to the normal value $S_{L0}$. By the way, even when the above-mentioned relative rotation occurs, the range of a compression ratio change itself is not changed and thus calibrating or correcting for an error (a deviation) corresponding to the relative rotation enables normal detection throughout the entire compression ratio range.

A characteristic S3 indicates a case where the decision value for the low compression ratio side stopper 50 is "C" and therefore the decision value for the high compression ratio side stopper 60 is "c", and hence the detected value $S_L$ of actual compression ratio sensor 42 for the lower-limit compression ratio $\varepsilon_L$ becomes lower than the reference value $S_{L0}$ and the detected value $S_H$ of actual compression ratio sensor 42 for the upper-limit compression ratio $\varepsilon_H$ becomes lower than the reference value $S_{H0}$. As discussed previously, by virtue of an in-cylinder pressure load, there is no occurrence of relative rotation to this direction (i.e., toward the low compression ratio side). Hence, it is determined that some abnormality (some failure) occurs (see step S6).

A characteristic S4 indicates a case where the decision value for the low compression ratio side stopper 50 is "B" and the decision value for the high compression ratio side stopper 60 is "a", and hence the detected value $S_L$ for the lower-limit compression ratio $\varepsilon_L$ becomes higher than the reference value $S_{L0}$, whereas the detected value $S_H$ for the upper-limit compression ratio $\varepsilon_H$ becomes identical to the reference value $S_{HO}$. This indicates or means that, as indicated by the drawing, the range of the actual compression ratio is limited due to foreign matter jammed or bitten into the control shaft 18 or the like. Accordingly, in this case, a calibration or a correction is not made to the sensor output value. Thereafter, for instance, the mode of operation shifts to a fail-safe mode.

According to the previously-discussed embodiment, the first arm 30 and the drive shaft 22 are configured such that relative rotation between them is permitted. Therefore, it is possible to prevent an excessive load from being applied to each component part of the linkage, and to certainly detect the relative rotation. Furthermore, by making a diagnosis on relative rotation through the use of the high compression ratio side stopper 60 as well as the low compression ratio side stopper 50, it is possible to distinguish the above-mentioned relative rotation (see the characteristic S2 of FIG. 5) from any other abnormality (see the characteristic S4 of FIG. 5) that the range of the compression ratio is limited.

On one hand, in the case of the diagnosis using the low compression ratio side stopper 50, there is a less risk of knocking. By executing the above-mentioned diagnosis, in particular, during catalyst warm-up after the engine has been started from cold, it is possible to minimize a deterioration of fuel economy, resulting from the diagnosis. On the other hand, the high compression ratio side stopper 60 is generally manufactured with a high accuracy, and hence it is possible to improve the diagnostic accuracy by executing the diagnosis using the high compression ratio side stopper 60. In the case of the diagnosis using the high compression ratio side stopper 60 there is a risk of knocking, but in the shown embodiment the diagnosis is executed at the time of stop processing, for instance, after a stop of internal combustion engine 1, and thus this is a small matter.

By the way, in the shown embodiment, the diagnosis using the low compression ratio side stopper 50 (see FIG. 3) and the diagnosis using the high compression ratio side stopper 60 (see FIG. 4) are executed in parallel with each other. In lieu thereof, either of these two diagnoses may be executed. In that case, if some abnormality has been detected, the actuator 24 is stopped, and then the routine terminates.

Furthermore, in the shown embodiment, the decision value for the low compression ratio side being set to "normality" (that is, "A"), is regarded as a case that there is no occurrence of relative rotation, and thus the diagnosis on relative rotation using the high compression ratio side stopper 60 is omitted. In lieu thereof, in order to more certainly diagnose relative rotation, even in the case that the decision value is set to "A", the diagnosis on relative rotation using the high compression ratio side stopper 60 may be executed in parallel.

Moreover, in the shown embodiment, when the decision value for the low compression ratio side is "C", a determination that some abnormality occurs is made. In lieu thereof, a determination that relative rotation toward the low compression ratio side occurs may be made.

The invention claimed is:

1. A variable compression ratio internal combustion engine comprising:
    a variable compression ratio mechanism in which a mechanical compression ratio of the internal combustion engine changes in accordance with a rotational position of a compression ratio control member rotated by an actuator;
    a mechanical linkage including an arm fitted to a drive shaft of the actuator for transmitting rotary motion of the drive shaft, while converting the rotary motion of the drive shaft to rotary motion of the compression ratio control member;
    a sensor for detecting a rotational position of the drive shaft as a parameter corresponding to the compression ratio; and
    at least one stopper for restricting movement of the compression ratio control member or movement of the linkage at a position corresponding to an upper-limit compression ratio or a lower-limit compression ratio,
    wherein a controller is provided for executing a diagnosis, based on a detected value of the sensor in a state where the compression ratio control member or the linkage has been restricted by the stopper, on whether or not relative rotation of a fitted portion of the arm with respect to the drive shaft is present.

2. The variable compression ratio internal combustion engine as recited in claim 1, wherein:
    the stopper is provided at the position corresponding to the lower-limit compression ratio; and
    the controller is configured to cause the compression ratio control member and the linkage to move to a restriction position restricted by the stopper and then execute the diagnosis.

3. The variable compression ratio internal combustion engine as recited in claim 2, wherein:
    the controller is configured to execute the diagnosis during catalyst warm-up after the engine has been started from cold.

4. The variable compression ratio internal combustion engine as recited in claim 1, wherein:
    the stopper is provided at the position corresponding to the upper-limit compression ratio; and
    the controller is configured to execute a movement of the compression ratio control member and the linkage to a restriction position restricted by the stopper and then execute the diagnosis.

5. The variable compression ratio internal combustion engine as recited in claim 4, wherein:
    the controller is configured to execute the movement to the restriction position and the diagnosis, after a stop of operation of the internal combustion engine.

6. The variable compression ratio internal combustion engine as recited in claim 1, wherein:
    the at least one stopper comprises a stopper provided at the position corresponding to the upper-limit compression ratio, and a stopper provided at the position corresponding to the lower-limit compression ratio; and
    the controller are configured to cause the compression ratio control member and the linkage to move to restriction positions restricted by the respective stoppers, and then distinguish the relative rotation from any other abnormality, based on the detected values of the sensor at the respective restriction positions.

7. The variable compression ratio internal combustion engine as recited in claim 6, wherein:
    the controller is configured to permit the detected value of the sensor to be calibrated when a determination that the relative rotation occurs is made.

* * * * *